United States Patent

Mortimer et al.

[11] Patent Number: 5,921,640
[45] Date of Patent: Jul. 13, 1999

[54] ELECTRONIC BRAKING SYSTEMS

[75] Inventors: Ivan Mortimer; Robert Alan Anderson, both of West Midlands, United Kingdom

[73] Assignee: Lucas Industries Public, Ltd., Solihull, United Kingdom

[21] Appl. No.: 08/647,594

[22] Filed: May 13, 1996

[30] Foreign Application Priority Data

May 19, 1995 [GB] United Kingdom .................... 9510177

[51] Int. Cl.$^6$ ....................................................... B60T 8/32
[52] U.S. Cl. .................... 303/125; 303/15; 303/119.2; 303/155; 303/113.4; 303/14
[58] Field of Search .............. 303/119.1, 119.2, 303/113.1, 113.2, 116.1, 166.2, 3, 10, 11, 20, 125, 117.1, 122, 122.04, 13, 14, 15, 155, 113.4, 9, 113.3, 188, 189, 190, 187, 186, DIG. 1–DIG. 4, 122.09, 122.14

[56] References Cited

U.S. PATENT DOCUMENTS

| | | | |
|---|---|---|---|
| 3,034,836 | 5/1962 | Ruof | 303/119.1 |
| 4,743,076 | 5/1988 | Davis et al. | 303/119.1 |
| 4,746,172 | 5/1988 | Gath et al. | 303/119.2 X |
| 4,812,777 | 3/1989 | Shirai | 303/14 |
| 4,902,075 | 2/1990 | Uno et al. | 303/14 |
| 5,106,167 | 4/1992 | Matsuda | 303/15 |
| 5,186,525 | 2/1993 | Sato et al. | 303/117.1 |
| 5,234,086 | 8/1993 | Matsuda et al. | 188/358 |
| 5,248,190 | 9/1993 | Sato et al. | 303/113.4 |
| 5,333,944 | 8/1994 | Shirai et al. | 303/113.4 |
| 5,375,917 | 12/1994 | Inagaki et al. | 303/113.6 |
| 5,443,306 | 8/1995 | Broome | 303/15 |
| 5,472,268 | 12/1995 | Ando et al. | 303/117.1 |
| 5,567,021 | 10/1996 | Gaillard | 303/113.4 |
| 5,588,718 | 12/1996 | Winner et al. | 303/14 |

*Primary Examiner*—Douglas C. Butler
*Attorney, Agent, or Firm*—Laff, Whitesel & Saret, Ltd.

[57] ABSTRACT

An hydraulic braking system is disclosed which comprises a fluid source and brake actuators, wherein a first master control valve is provided to supply substantially equal pressures to all brake actuators and additional control valves are provided to regulate pressures applied to respective ones of said brake actuators. The first control valve and the additional control valves are provided in series between the fluid source and the brake actuators so that operation of the master control valve allows equal hydraulic pressures to be applied to each actuator while the additional control valves allow individual brake regulation and in an emergency operation of the master control valve allows for automatic operation of all the actuators.

12 Claims, 3 Drawing Sheets

ELECTRONIC BRAKING SYSTEMS

This invention relates to hydraulic braking systems, and particularly, but not exclusively to braking systems of the kind such as electronic braking systems (EBS) which provide brake control dependent of input from the driver such as Anti-Lock (ABS), and Traction Control (TCS) systems.

Electronic braking systems (EBS) are systems where the brakes of a vehicle are applied at least in part from a discrete power source either in proportion to the driver's requested braking demand or in accordance with system derived braking demands for automatic, non-driver, brake applications.

For brake applications conventionally known and referred to herein as normal braking, the driver's braking demand is sensed, by direct or indirect measurement of either the load applied by the driver to the brake pedal or by displacement of the brake pedal caused by the driver. This is then converted into a control parameter which, in turn, is adapted to control the output of a fluid pressure source to a brake actuator. Typically the pressure developed at the brake actuator is measured by a pressure sensor and is compared in an electronic control unit against the driver's braking demand, any error or discrepancy in the desired and measured pressures being used to adjust the control parameter so as to reduce the measured error to zero.

For so called automatic brake applications where the brakes are controlled independently of the driver's input, for example during ABS, TCS and other automatic brake control such as brake apportioning and hill hold, individual brake pressure regulation of each brake, or at least each axle set, is required in order to achieve the range of control necessary for adequate performance and vehicle stability.

Therefore EBS systems require individual brake controllers or control apparatus in order to achieve full range of desired functions. In addition it is desirable, under normal conditions, to maintain an even balance of pressure on all individual brake control valves.

Whilst individual brake control valves provide the desired range of features, problems can occur when one or more of the brake controllers fail to supply the required or demanded brake pressure. If such a failure occurs during braking, then arrangements can be made, as hereinafter described, to supply fluid pressure from an alternative source. Another failure with far more serious implications exists if the brake control valve fails in a condition known as open circuit i.e. where the connection between fluid power source and the brake is enabled without either driver or automatic demand having being made. The result is an unwanted brake application on at least one brake or brake sets (axle) causing loss of vehicle stability without any driver warning.

When a multiple set of control channels needs to be controlled so as to operated at substantially at identical or matched pressure levels for the majority of normal braking, it becomes essential that the measurement of the feedback parameter, in this case the measurement of the developed pressure level in the brake actuators, is accurate and it's accuracy can be regularly checked. This means that each brake requires a pressure transducer that can be accurately calibrated and must ensure that it will consistently output an accurate signal which is effectively matched to the others in the vehicle system. The use of such pressure sensors is essential in order to guarantee a consistent output and thereby to maximise the safe operation of the system.

Where EBS system provide the sole source of fluid pressure for operating the brakes of a vehicle, it has been recognised that such systems require an additional support system or backup system. So called push through systems, that are typically hydrostatic in nature and are usually derived from a driver operated master cylinder whose output is switched into one or more brake actuators upon full failure or partial failure of the EBS system, are known in this regard. However, substantial safeguards have to be implemented in order to prevent the incorrect introduction of the backup system and or the failure of the backup through channelling of the pressure into the faulty EBS system.

According to a first aspect of the invention an hydraulic braking system comprises a fluid source and brake actuators in which a first master control valve is provided to supply substantially equal pressures to all brake actuators and additional control valves are provided to regulate pressures applied to respective brake actuators.

This enables us to produce a system, particularly an EBS system, having normal brake control where the output pressures to all brake actuators is substantially identical and yet where individual brake regulation can be achieved for automatic brake control features.

In this way the highly desirable aim of equality of pressure to brake actuators is achieved but automatic braking (such as ABS) can still be provided when needed by individual control.

Preferably the first control valve controls the operation of all brake actuators during normal braking, with the additional control valves controlling their respective brake actuators during automatic braking.

Alternatively the additional control valves are adapted to control their respective brake actuators during normal and automatic braking. Most preferably the first control valve remains fully open in this mode unless a fault is detected.

Preferably the first control valve and the additional control valves are provided in series between the fluid source and brake actuators. In this way an additional level of control is provided in the event of a fault in part of the system.

Additional control valves may be provided for each axle or each wheel of the system. Thus a master control valve and individual control valves are provided.

Preferably the master control valve supplies the same fluid pressure, which is in proportion to the desired brake pressure demand, to each brake actuator for normal braking, via fully opened individual brake control valves.

Alternatively, the master control valve is opened fully upon brake demand to supply full pressure to inlets of each individual control valve which in turn regulate the brake pressures in each brake actuator.

Preferably the system operation is controlled by an electronic control unit (ECU) which receives signals from sensors and sends signals to the control valves accordingly.

Preferably, upon actuation of the master control valve and the individual brake control valves, during normal brake control, the pressure sensors at each brake site are compared for correlation with each other, conveniently by the ECU. Comparison against either the driver's pedal displacement and/or the hydrostatic backup pressure developed by the driver in a support system, can also be provided.

In this way significant deviations and/or gradual variations in sensor signals can be detected. Significant deviations can be used as indicative of faults in the system, whilst gradual variations can be accounted for by the ECU in terms of the controlling signals sent to the individual control valves.

Preferably at times during non brake application, when the vehicle is at stand still, the individual brake control valves are closed so as to isolate the brake actuators from the fluid power source, and the master control valve is fully opened so as to equalise the fluid pressure across the valve, during said operation a power source sensor output on the fluid source side of the master control valve can be compared against the master control valve sensor output for correlation.

Problems with the master control valve can thus be detected.

Additionally or independently, during the aforementioned sensor correlation check, the pressure output of the master control valve can be set to a nominally low pressure whereupon the individual brake control valves can be opened and the brake actuator pressure sensor's output's can be checked for correlation with each other and the master control valve sensor output.

Accurate system checks are thus provided detecting faults and allowing adjustments in operation to be made.

The sensor correlation checks could preferably be part of a vehicle system start-up routine where it would be preferable to check all components within the EBS system for integrity. The advantage of low pressure checking of the brake actuator sensor's outputs as start up is that little or no braking effect is established within the brake system and therefore the start-up check routine is completed rapidly without detriment to the driver's ability to assume control of the vehicle.

Preferably the system is provided with a backup system to apply the brakes of the vehicle manually upon the unlikely event that the EBS system sees a full or partial failure.

Preferably the driver's brake pedal is operatively connected to a fluid master cylinder which is adapted to generate a fluid pressure in direct proportion to the driver's braking demand at the inlet of an isolator valve, and the isolator valve is adapted prevent the hydrostatic fluid pressure from reaching or affecting the pressure within the brake actuators during normal operation.

Undesirable mistaken introduction of push through backup is thus avoided.

Preferably the isolator valve is operated in such a manner as to provide venting to atmosphere of the brake actuator for at least some period during non-braking activity. This avoids any pressure variation in the trapped volume between the isolation valve and brake actuators, due to temperature variation, which could undesirably cause brake actuation.

Preferably said isolation valve is adapted to remain open for all periods of non EBS activity only to be closed upon movement of the brake pedal.

Alternatively said isolation valve is adapted to close upon release of the throttle pedal and/or depression of the brake pedal.

Alternatively said isolation valve is adapted to remain closed during normal running of the vehicle, only to be opened for short periods by the electronic control unit.

Preferably the hydrostatic back-up system can be fed directly into the selected brake actuators when said isolation valve opens and is prevented from mixing with the EBS power fluid system by slave valves located downstream of the individual brake control valves. Thus any problems of the EBS system do not effect the backup system.

According to a second aspect of the invention an hydraulic braking system comprises a first system in which a first fluid source supplied pressure to brake actuators, the transfer of pressure being controlled by one or more of the additional control valves and a backup system in which a second fluid source supplies pressure to one or more of said brake actuators, the second fluid source being isolated from the brake actuators until a fault is detected in said first system where upon pressure from the second source is transmitted to the brake actuators.

The second fluid pressure may be applied direct to one or more brake actuators or more preferably via slave valves provided downstream of said control valves in said first and second fluid sources.

In this way two separate systems are provided in which a problem in the first braking system is maintained completely independent of the backup system due to the slave valve operation.

The provision of the backup system ensures that push through is available in the unlikely event of full or partial failure of the EBS system.

Some embodiments of the invention are illustrated in the accompanying drawings in which.

Figure 1:
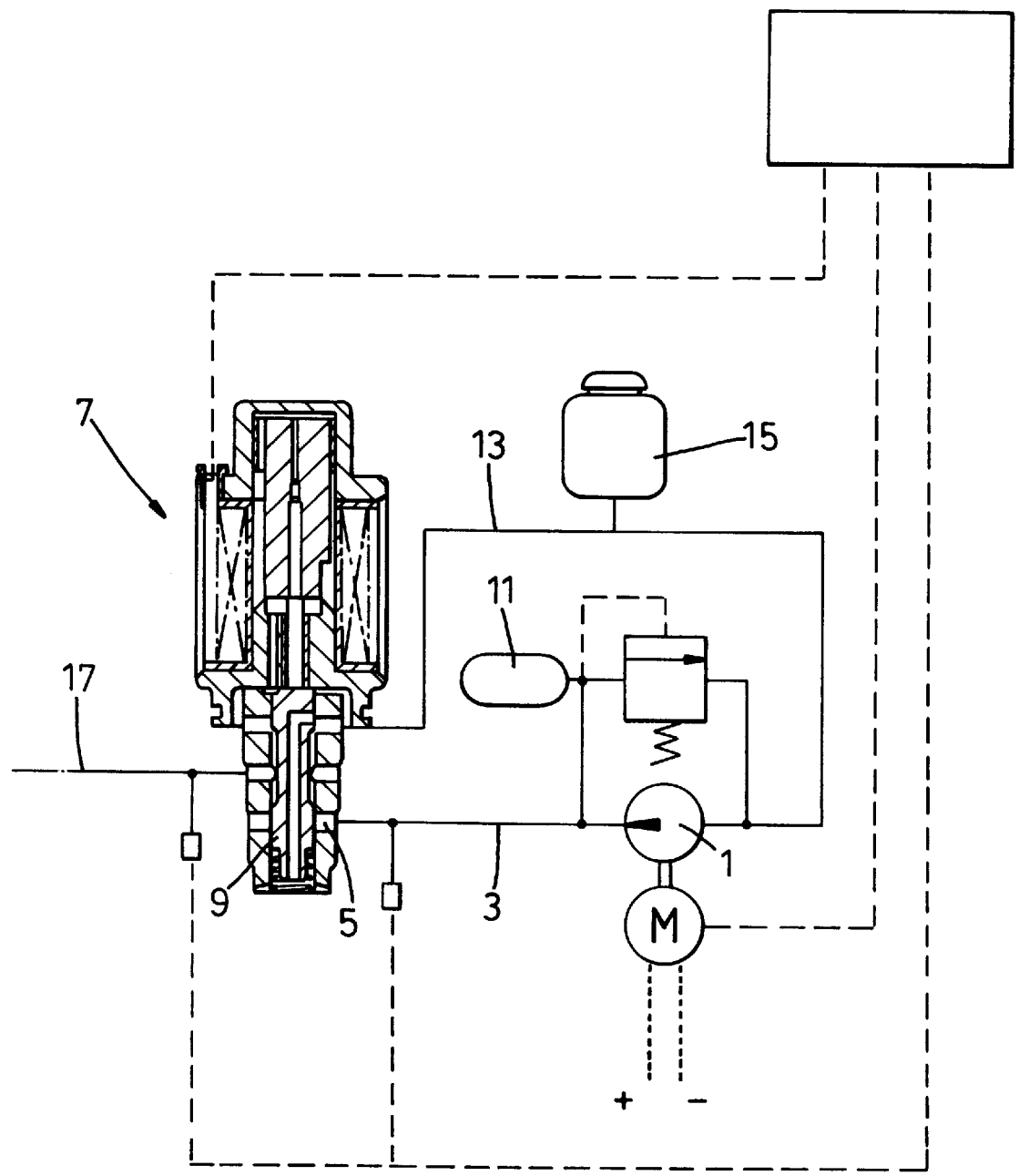
FIG. 1 is a layout of a portion of a braking system in which a control valve is adapted to control the fluid pressure within the system, known as the master control valve.

Illustrated in FIG. 1 of the accompanying drawings high pressure fluid within a circuit is provided by pump 1, driven by motor M. The motor M is controlled by an electronic control unit ECU 2, and acts to maintain the pressure in an accumulator 11. Pressure levels in the accumulator system are monitored by a sensor 51.

The accumulator 11 under pressure supplies fluid to a line 3 which leads to an inlet 5 of a master control valve 7. The master control valve 7 comprises a solenoid operated actuator provided with an armature adapted to move a spool 9 axially in a bore. The ECU controls the spool 9 position and hence fluid flow through the control valve 7.

With the master control valve 7 in the position illustrated in FIG. 1 of the drawings, fluid from the line 3 is prevented from flowing through it. As a consequence pressure remains stored in accumulator 11.

A line 13 vents to atmosphere through a tank 15 thereby avoiding any changes in pressure within the system due to changes in temperature.

Figure 2:
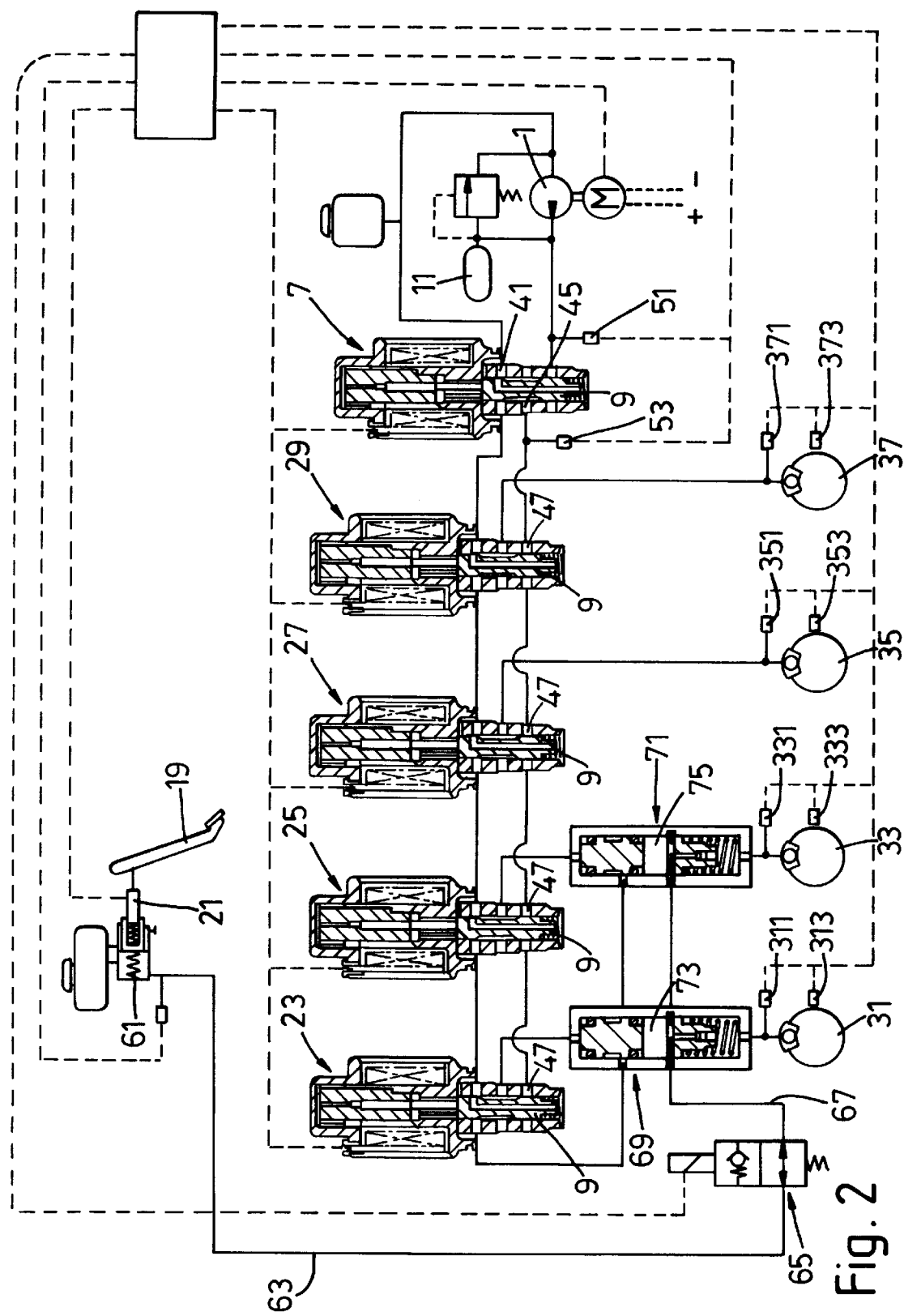
FIG. 2 is a layout of a full braking system including the portion illustrated in FIG. 1.

In the complete braking system illustrated in the layout of FIG. 2 a pedal 19 is adapted to act on a travel transducer 21 to initiate operation of the system for normal service braking with the pedal 19 movable through a first range.

Four proportional solenoid-operated hydraulic actuators 23, 25, 27 and 29, each including a solenoid-operated armature adapted to move a spool 9 axially in a bore against the loading in a return spring are adapted to control the application of brake applying pressure to the individual brakes 31, 33, 35 and 37 of the vehicle. Specifically the actuator 23 controls the supply of fluid to a brake 31 on the front left driven wheel of the vehicle, the actuator 25 controls the supply of brake applying fluid to a brake 33 on the front right driven wheel of the vehicle, the actuator 27 controls the supply of fluid to a brake 35 on the left rear wheel of the vehicle, and the actuator 29 controls the supply of fluid to the brake 37 on the rear right wheel of the vehicle.

As an alternative in a modification, the four independent control valves may be replaced by cheaper 3 position valves as generally known in the ABS art.

An electronic control unit receives electrical signals from the travel transducer 21, and produces signals for energising the master control valve 7 and the individual control valves 23, 25, 27 and 29 in accordance with the required demands of the driver/vehicle.

In the normal brakes off, rest position, all actuators are switched off. Thus communication exists from tank 15 through to the slave valves and/or brakes. In this way the fluid power is isolated at the master control valve and at the individual control valves in the off state.

The system is operated for normal service braking by movement of the pedal 19 which acts on the travel transducer 21, and in response to a signal from the transducer 21 the electronic control unit 2 operates the master control valve 7.

The control unit 2 supplies a control signal to the proportional solenoid valve 7 so as to cause the solenoid armature to apply a force to the spool 9 which is in proportion to the driver's braking demand. Movement of the spool in a downward direction will cause a connection 41 to be isolated and the connection 5 uncovered. The fluid pressure will be fed into the brakes and into the independent valves via a connection 45. As the pressure increases its value is measured by the pressure transducers. When this pressure reaches the demand valve the electronic control unit 2 reduces the control signal. At this point, the spool valve moves slightly upward so that they both isolate the individual valves and brakes from the power source.

Any increase in braking demand will cause a corresponding increase in armature force which will result in the reconnection of ports defining the connection 5 and 45 and thus an increase in pressure applied to the brake actuator.

Any decrease in braking demand will result in a decrease in downward armature force. This will allow the spool valve to move upwards so as to establish connection between the ports 45 and 41. As the pressure in the hydrostatic line between the master cylinder and the port 41 is always lower than that in the brakes, because the power system is always arranged to provide a greater output, i.e. servo, then once this connection has been established the pressure in the brakes can be released in return to the accumulator circuit via port 41.

The mode of operation for the individual control valves follows that of the master cylinder valve as discussed above.

Under normal braking, equality of pressure is desirable on all brakes, or at least on each brake on an axle. Consequently the control unit 2 opens fully the four individual control valves 23, 25, 27 and 29 and simultaneously opens the master control valve 7 to output desired pressure, thereby establishing communication between inlet ports 47 and the brakes 31, 33, 35 and 37. The pressure applied to the brakes is regulated by the master control valve 7 alone with the individual control units remaining fully open. This ensures even treatment of each of the actuators.

If in this mode ABS, TCS or any other non-driver controlled brake operation is required which needs the brake pressure on individual brakes 31, 33, 35 and 37, or at least on each axle, to be controlled independently, the control is changed over. As a consequence, upon initiating such non-driver controlled brake operation, the master control valve 7 is switched so that control is given to the individual control valves 23, 25, 27 and 29. Thus with the master control valve 7 fully open the individual valves vary their applied pressure to the brakes according to signals received from the control unit 2 depending on signals from a respective brake site pressure sensor 311, 331, 351, 371 and wheel speed sensors 313, 333, 353, 373.

Thus if wheel spin, wheel lock or the like is detected the individual valve receives signals from the control unit 2 to correct the condition independently of the other valves.

In an alternative mode of operation the master control valve 7 can be maintained fully open with the individual control valves 23, 25, 27 and 29 controlling the brake pressure applied during both normal and automatic braking. The enhanced system security is still present due to the master control valve 7 in series which can be used as an override.

In this mode, however, loss of function in one or more of the individual valves 23, 25, 27 and 29 does not have the potentially serious effect of prior art systems since the provision of a master control valve 7, in series with the individual valves 23, 25, 27 and 29 allows an alternative way to control braking in the event of a fault in a particular unit. Thus the control valve 7 can be used to override a fault in an individual control valve 23, 25, 27 or 29.

As previously mentioned the accuracy of pressure measurement within different components of the system is important. The present described system allows correlation between the brake site pressure sensors 311, 331, 351, 371 to be checked at frequent intervals.

By operating the individual valves fully open during normal braking and controlling brake pressure by means of the master control valve 7 signals from the brake site pressure sensors 311, 331, 351, 371 can be compared against each other by the control unit 2. As even braking is applied, similar, even, signals would be expected according to the predetermined ratio for front to rear braking pressure. Any significant deviation from this level between axles or individual brakes is suggestive of a fault which can be indicated to the driver.

Figure 3:
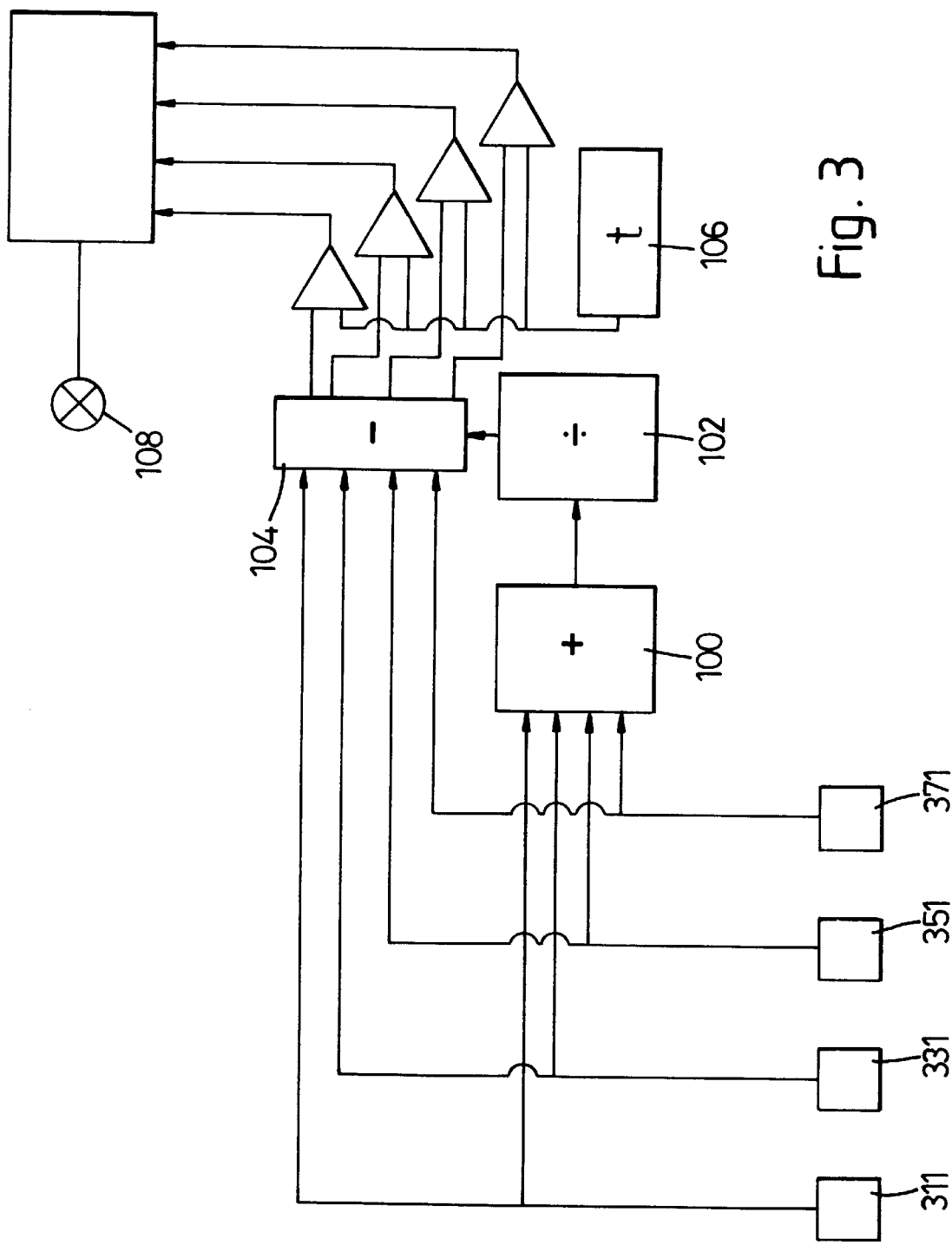
FIG. 3 is a diagram of a circuit for correlating in the braking system sensor measurements.

As illustrated in the circuit of FIG. 3, to correlate the brake site pressure sensors 311, 331, 351, 371 for errors and/or variations, the signals are fed through the circuit.

A signal from each of the sensors 311, 331, 351, 371 is sent to an adder 100, with the aggregate being divided by a divider 102, to give an average value.

The average is sent as a signal to a subtracter 104 where the average is deducted from the individual signals from the brake site sensors.

The magnitude of these signals are then fed to comparator units C1, C2, C3, C4 where they are compared against a threshold value 106. Variations of the signals beyond this threshold value 106 are used to signal to the driver of a potential problem, conveniently by energising a warning light 108.

In the normal operation the subtracted signals are within the threshold and so no further action is necessary.

In addition to monitoring sensor accuracy during normal braking, diagnostic checks can be performed on the other sensors as part of a start up procedure whilst the car is stationary. By closing the individual valves and with the master control valve 7 fully open the signal from the accumulator sensor 51 can be compared against signals from the master valve output sensor 53 for correlation purposes by the electronic control unit 2.

At a further stage, the master control valve 7 can be returned to a nominal low pressure with the individual control valves 23, 25, 27, 29 fully opened. Comparisons of the signals from the individual brake sites 311, 331, 351, 371 against each other and also against the master control valve pressure 53 can thus be obtained. Again significant discrepancies would be suggestive of a fault. Smaller errors, contributable to sensor variation, can be compensated for by the electronic control unit 2 in further operations thus monitoring complete and accurate system monitoring.

In the event of a complete failure of the EBS system it is imperative that a backup system is provided. This is effected in the present embodiment by means of a push through system.

The push through system operates by continued advance of the pedal 19 beyond normal limits. This activates a hydrostatic pressure system for applying pressure to the front brakes. Pressure generated in a cylinder 61, see FIG. 2, is transferred through a line 63 to an isolator valve 65 controlled by the control unit 2. The isolator valve 65, under normal conditions, is closed preventing accidental operation of the push through system. In the closed state a volume of fluid trapped in a line 67 beyond the isolator valve 65 is vented to atmosphere to avoid inadvertent brake actuation.

Detection of a failure in the EBS system causes the electronic control unit 2 to close the individual valves and or the master control valve which isolates the brakes 31, 33, 35, 37 from the EBS fluid source 1.

The electronic control unit also opens the isolator valve 65 allowing pressure to be transferred through the slave valves 69, 71. Pressure transferred to the central portion 73, 75 of the slave valves in this way activates the brakes 31, 33, 35, 37 in response to the applied pressure. This permits braking even in the event of EBS failure. Furthermore, the provision of the push through system in this way renders the backup system completely independent of the EBS.

We claim:

1. An electronic braking system comprising a discreet hydraulic fluid source, a brake pedal, measuring means for producing a brake demand value dependent upon the load on the pedal or the pedal displacement and a number of brake actuators, said braking system further including a first master control valve provided in series between said hydraulic fluid source and said actuators, and additional control valves provided in series between the master control valve and respective actuators, wherein during a normal braking operation said master control valve is modulated to control the pressure developed at all said brake actuators dependent upon the measured brake demand value whilst said additional control valves are held open so that the pressure at all the actuators is substantially equal, and during an automatic braking operation selected from a group consisting of traction control, antilock control, brake apportioning and hill hold said master control valve is held fully open whilst said additional control valves are modulated to control the brake pressure applied to their respective brake actuators to achieve individual control of the brake actuators independent of the brake demand value.

2. A braking system according to claim 1, wherein said additional control valves are adapted to control their respective brake actuators during normal and automatic braking.

3. A braking system according to claim 2, wherein said first control valve remains fully open during normal and automatic braking, unless a fault is detected.

4. A braking system according to claim 1, wherein said additional control valves are opened for normal braking and wherein said master control valve supplies the same fluid pressure, which is in proportion to the desired brake pressure demand, to each said brake actuator, through said additional control valves.

5. A braking system according to claim 1, wherein said master control valve is adapted to open fully upon brake demand to supply full pressure to inlets of said individual control valves which, in turn, regulate said brake pressures in each said respective brake actuator.

6. A braking system according to claim 1, wherein operation of said system is controlled by an electronic control unit (ECU) which receives signals from sensors and sends signals to said control valves accordingly and, upon actuation of the master control valve and said brake control valves, during normal brake control, said pressure sensors at each brake site are compared for correlation with each other by said ECU.

7. A braking system according to claim 1, in combination with a vehicle, wherein during non brake application when the vehicle is at stand still, said brake control valves are closed so as to isolate said brake actuators from a fluid power source, and said master control valve is fully opened so as to equalize said fluid pressures across said valves, during said operation a power source sensor output on said fluid source side of the master control valve can be compared against output from a master control valve sensor for correlation.

8. A braking system according to claim 1, wherein said system is provided with a hydrostatic back-up system to apply said brakes actuators manually upon a full or partial failure of the braking system.

9. A braking system according to claim 8, wherein a driver's brake pedal is operatively connected to a fluid master cylinder adapted to generate a fluid pressure in direct proportion to braking demand of the driver at an inlet of an isolator valve, and said isolator valve is adapted to prevent hydrostatic fluid pressure from reaching or affecting the pressure within said brake actuators during normal operation.

10. A braking system according to claim 9, wherein said isolator valve is operated in such a manner as to provide venting to atmosphere of a one of said brake actuators for at least some period during non-braking activity.

11. A braking system according to claim 8, wherein said hydrostatic back-up system is adapted to be fed directly into said selected brake actuators when said isolator valve opens and is prevented from mixing with the power fluid system by slave valves located downstream of said individual brake control valves.

12. A braking system according to claim 1, comprises a first system in which a first fluid source supplies pressure to brake actuators, transfer of pressure being controlled by one or more of the additional control valves, and a back-up system in which a second fluid source supplies pressure to one or more of said brake actuators, said second fluid source being isolated from said brake actuators until a fault is detected in said first system where upon pressure from the second source is transmitted to said brake actuators.

* * * * *